United States Patent

Bothner et al.

Patent Number: 5,907,345
Date of Patent: May 25, 1999

[54] APPARATUS AND METHOD FOR DIGITAL DISC LABELLING AND PACKAGING

[75] Inventors: Carl R. Bothner, Rochester; Alfred J. Amell, Spencerport; Muhammed Aslam, Rochester, all of N.Y.

[73] Assignee: Eastman Kodak Company, Rochester, N.Y.

[21] Appl. No.: 08/809,006

[22] PCT Filed: Jun. 18, 1996

[86] PCT No.: PCT/US96/10470

§ 371 Date: Feb. 28, 1997

§ 102(e) Date: Feb. 28, 1997

[87] PCT Pub. No.: WO97/01800

PCT Pub. Date: Jan. 16, 1997

[51] Int. Cl.[6] .............................. B41J 2/385; G03G 9/08
[52] U.S. Cl. ................................... 347/156; 347/157
[58] Field of Search ........................... 53/474; 347/156, 347/103, 139, 154, 116, 157; 399/66, 67, 3, 4, 154, 301, 308, 310, 330; 346/137, 24, 25

[56] References Cited

U.S. PATENT DOCUMENTS

| | | | |
|---|---|---|---|
| 4,853,736 | 8/1989 | Goto et al. | 355/210 |
| 4,900,597 | 2/1990 | Kurtin | 428/41 |
| 5,168,315 | 12/1992 | Osawa et al. | 355/290 |
| 5,285,620 | 2/1994 | Kaye et al. | 53/474 |
| 5,317,337 | 5/1994 | Ewaldt | 346/1.1 |

FOREIGN PATENT DOCUMENTS 0 297 668  1/1989  European Pat. Off. ......... G06K 1/12

*Primary Examiner*—Benjamin R. Fuller
*Assistant Examiner*—Raquel Yvette Gordon
*Attorney, Agent, or Firm*—Doreen M. Wells

[57] ABSTRACT

Method and apparatus for preparing a digital disc-literature assembly. In the method, a sheet of print media is electrophotographically printed. The sheet has a literature portion bearing a fused toner image and a transfer portion bearing a transferable toner image. The transferable toner image and the face of a digital disc are placed in registration and the transferable toner image is fused to the face of the digital disc. The literature portion is configured for inclusion with the digital disc. The digital disc and literature are assembled.

10 Claims, 7 Drawing Sheets

APPARATUS AND METHOD FOR DIGITAL DISC LABELLING AND PACKAGING

FIELD OF THE INVENTION

The invention relates to digital disc related methods and apparatus. The invention more particularly relates to an apparatus and method for digital disc labelling and packaging.

BACKGROUND OF THE INVENTION

The term "electrophotographic printer" is used hereafter to refer generically to electrostatographic copiers and printers, unless otherwise indicated by context.

The term "digital disc" is used herein to refer generically to an article of digital storage media that takes the form of a thin and rigid disc of unitary structure. A digital disc has a surface, referred to herein as the "face", available for display of printed information. Information stored on a digital disc is generally in optically readable form; however, magnetic storage is not excluded.

Digital discs are finding increasing use in the high density storage of digital information, such as digitized music, digitized photographs, and computer programs. At present, three principal types of digital discs are in common use. The first type, referred to as a CD or ROM (read only memory) disc, is manufactured by pressing depressions into a substrate, in a manner analogous to the manufacture of phonograph records. A second type of digital disc, referred to as a writable optical storage disc, has the capability of having information recorded (written) thereon at some time after fabrication of the medium. A third type, referred to as an erasable disc, can also have information added after fabrication, but that information can be erased or modified at a later time.

A digital disc has a substrate overlaid with a layer that stores the digital information. The substrate is transparent to the radiation used to read the disc. Overlying the storage layer is a protective layer. The surface of the protective layer, also referred to as the "face" or "face", commonly bears printed information. U.S. Pat. No. 5,317,337 teaches a method for printing the face of a digital disc using an ink jet printer. Alternative methods or printing, including solid-ink printing, thermal-transfer technology, dye-diffusion methods, and color laser printing are mentioned in relation to an article in the periodical "Computer Design". U.S. Pat. No. 5,282,187 teaches the use of a felt tip pen or the like to mark the face of a compact disc.

Digital discs are most often marketed with one or more pieces of human readable printed material. For convenience, the term "information package" is used herein to refer to the information included for the user, in a digital disc of whatever type, along with the information printed on the accompanying printed media. Commonly, a digital disc is marketed in a plastic storage box, commonly referred to as a "jewel box". A jewel box, typically has a transparent base that includes a folded sheet of informational printed media, referred to herein as a "backplate", covered by an insert (commonly opaque) that grips the digital disc. A transparent cover is hinged to the base. A booklet having one or more sheets of folded printed media, referred to herein as an "insert booklet", is commonly held by the cover. U.S. Pat. No. 4,709,812 teaches a printed, folded paperboard alternative to a jewel box.

U.S. Pat. No. 5,207,050 and U.S. Pat. No. 5,285,620 teach apparatus and methods for assembling digital discs and literature into jewel boxes or the like.

The above methods have the shortcoming that the printing of a digital disc and its accompanying literature are not produced by the same printer at the same time. This presents a problem if it is desired to match the colors of pictorial copy on both the receiving surface of a digital disc and on accompanying literature, particularly if it is impractical to proof the color match before a product run. A particular situation in which it is impractical to proof colors is the preparation of individual digital disc information packages on demand.

It would be desirable to provide a method and apparatus for preparing a digital disc-literature assembly in which the image for a digital disc and its accompanying literature are printed simultaneously.

SUMMARY OF THE INVENTION

The invention provides methods and apparatus for preparing a digital disc-literature assembly. In the method, a sheet of print media is electrophotographically printed. The sheet has a literature portion bearing a fused toner image and a transfer portion bearing a transferable toner image. The transferable toner image and the face of a digital disc are placed in registration and the transferable toner image is fused to the face of the digital disc. The literature portion is configured for inclusion with the digital disc. The digital disc and literature are assembled.

It is an advantageous effect of the invention that a method and apparatus are provided for preparing a digital disc-literature assembly in which the images for a digital disc and its accompanying literature are printed simultaneously.

BRIEF DESCRIPTION OF THE FIGURES

The invention itself will be better understood by reference to the following description of an embodiment of the invention taken in conjunction with the accompanying figures wherein.

DETAILED DESCRIPTION OF THE INVENTION

The method of the invention is directed to the preparation of a digital disc-literature assembly including a digital disc bearing printed information on its face and literature for inclusion with the digital disc.

Figure 1:
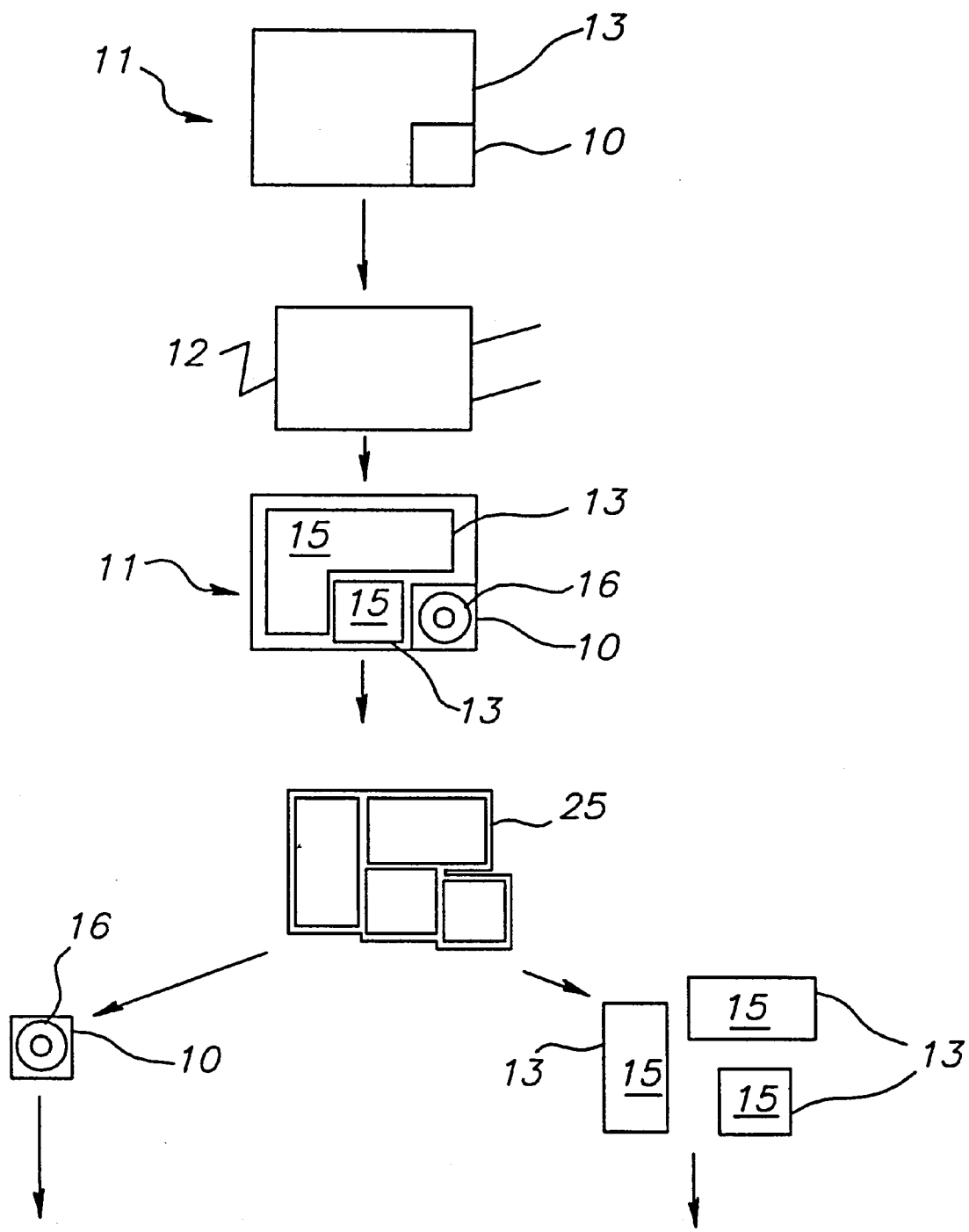
FIG. 1 is a diagrammatical view of part I of an embodiment of the method of the invention.
Figure 2:
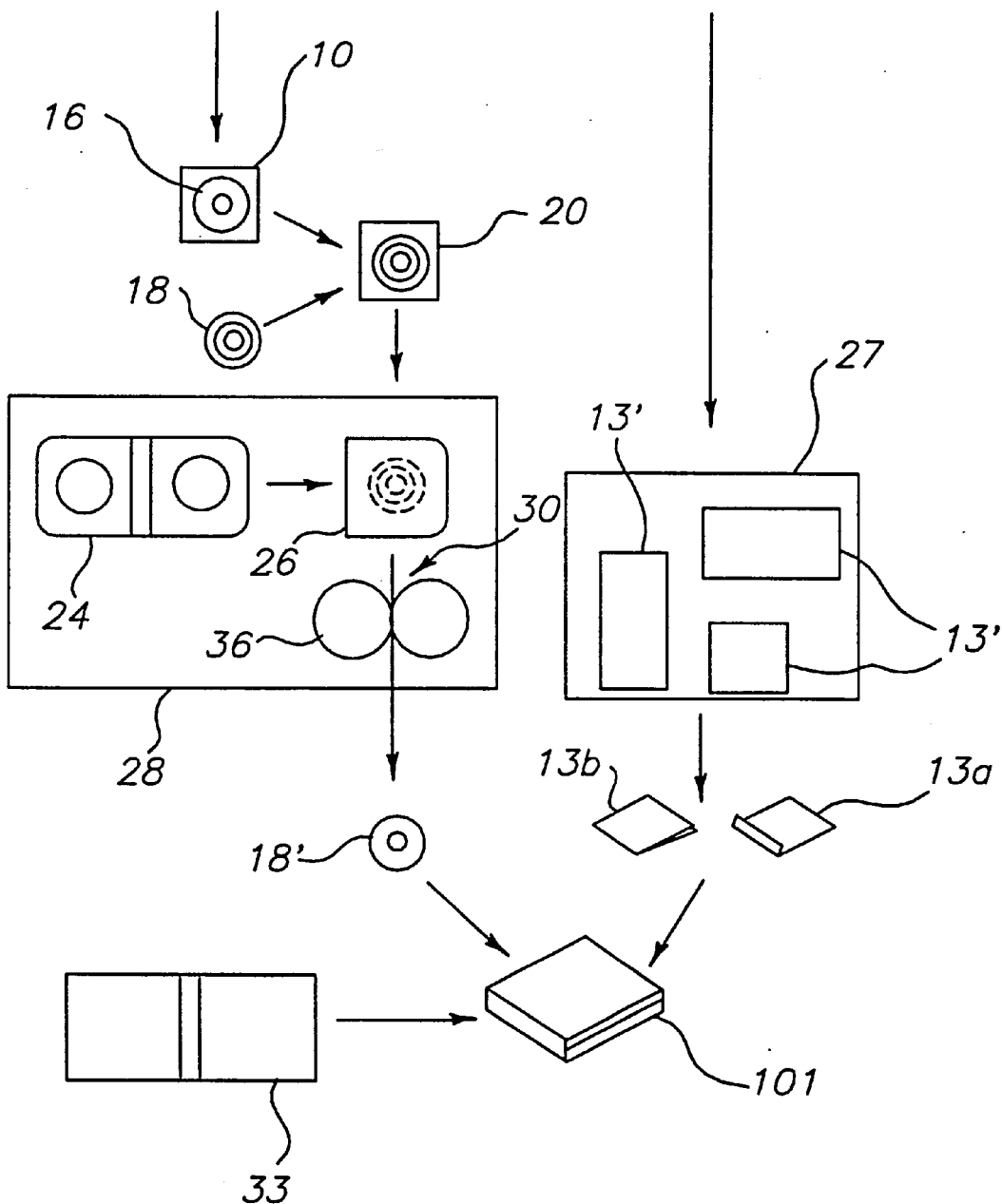
FIG. 2 is a diagrammatical view of part II of the embodiment of the method of the invention of FIG. 1.

The method of the invention has two parts, referred to herein as parts I and II, and illustrated in FIGS. 1 and 2, respectively. Referring now to FIG. 1, the method of the invention begins by electrophotographically printing (indicated by copier 12) a toner image onto a sheet of print media 11 referred to herein as a "partial transfer sheet". The printing of the partial transfer sheet 11 of the invention yields what is referred to herein as a "toned partial transfer sheet".

Figure 3:
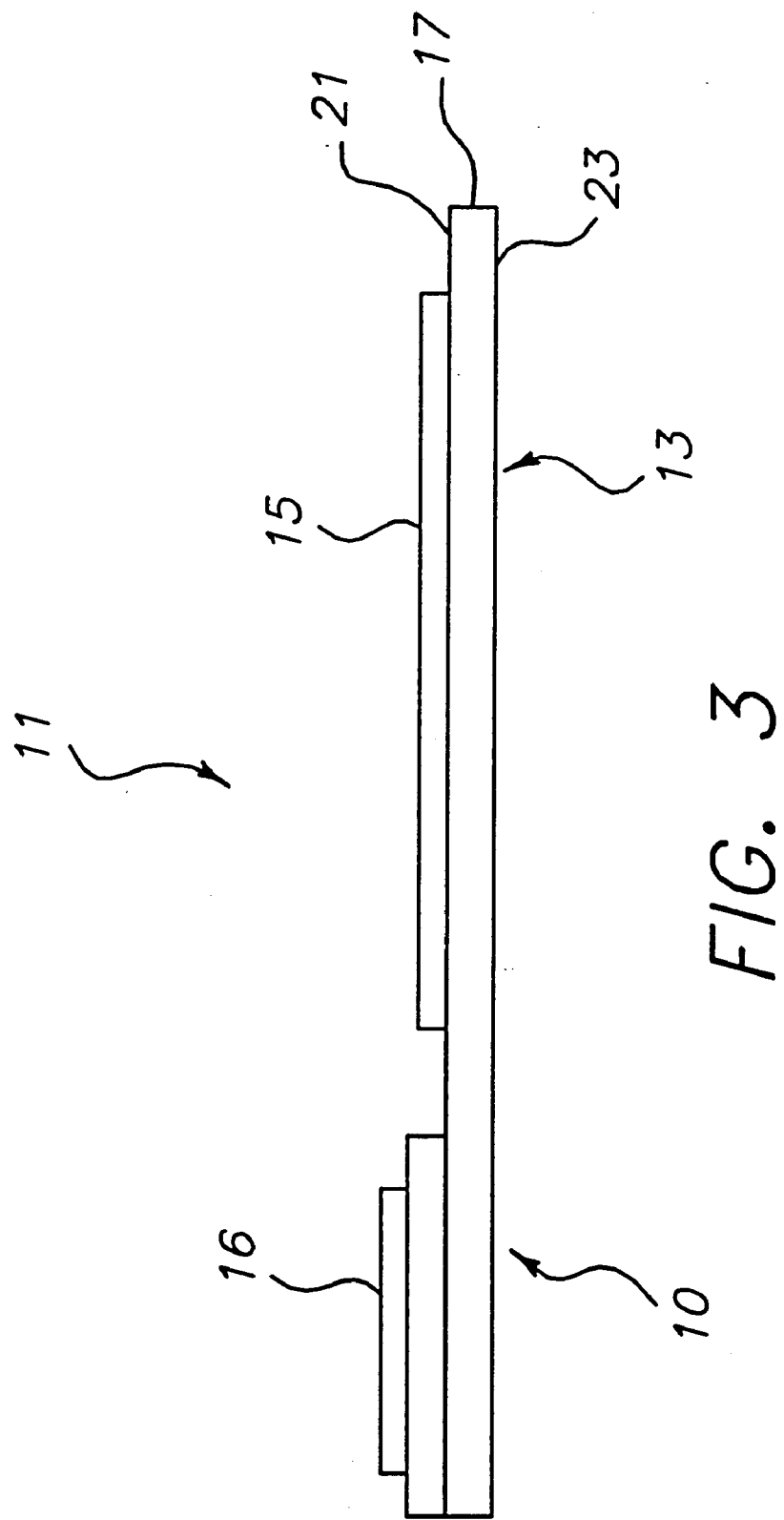
FIG. 3 is a diagrammatical cross-sectional view of the partial transfer sheet of the invention.

Referring now to FIGS. 1 and 3, the partial transfer sheet 11 has a literature portion 13 and a transfer portion 10. The toner image fuses with the partial transfer sheet 11 in the literature portion 13 to provide what is referred to herein as a "fused toner image 15". In the transfer portion 10 of the sheet 11, the toner image is "unfused" and is described herein as being a "transferable toner image 16" or a "transferable image 16". The term "unfused" is slight misnomer. In an electrophotographic printer, a toner image is initially formed of discrete particles of toner which are then fused to each other and to a receiver. In the transfer portion 10 of the partial transfer sheet 11, toner particles forming the transferable image 16 are fused to each other. There is sufficient adherence of the transferable toner image 16 to the transfer portion 10 so as to prevent significant offset, that is, retention of a portion of toner image on the fusing system of the printer. The transferable toner image 16 is not so adhered to the transfer portion 10 that it will not transfer to a digital disc 18 placed in contact with the transferable toner image 16 under conditions substantially the same as those in the fusing system of the electrophotographic printer 12.

The partial transfer sheet 11 has a support or support layer 17 and a transfer layer 19. The support 17 is a substantially planar electrophotographic receiver, that is, a sheet of copy paper or transparency material or other sheet material which can receive an electrophotographic toner image and to which the electrophotographic toner image can be permanently fused. The support 17 can be uniform in composition or can have a multilayer structure.

The transfer layer 19 is a low surface energy material that has an adhesive strength, relative to the transferable toner image, that is within a selected range that allows the support to retain and then release the transferable toner image as required by the method of the invention. This adhesive strength is expressed herein as a peel force, (peel forces herein are measured at 90°). The support has a surface energy that is insufficient to retain a transferable toner image subject to a peel force of greater than about 550 Newtons/meter.

Suitable transfer supports preferably have a surface energy that is insufficient to retain a transferable toner image subject to a peel force of from 3 to 15 Newtons/meter (measured at 90°). Suitable materials for the transfer layer include alkyl fluorophosphonates and certain amorphous perfluorocarbons. The alkyl fluorophosphonates have the general structure:

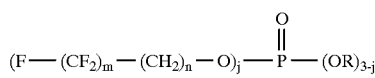

where j is 1 or 2; m is from about 3 to about 8; n is from about 1 to about 6; and R is selected from the group consisting of $NH_4$ and H. One example of a commercially available alkyl fluorophosphonate is identified by the general structure:

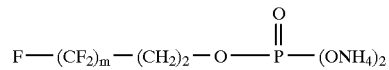

where m is from 3 to 8. This material is available from E. I. du Pont de Nemours and Co. of Wilmington, Del., under the designation: "Zonyl™ FSE". Zonyl™ FSE has a surface energy of from 16 to 20 dynes/cm. Another commercially available alkyl fluorophosphonate is identified by the general structure:

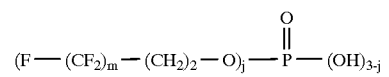

where m is from 3 to 8 and j is 1 or 2. This material is available from E. I. du Pont de Nemours and Co. under the designation: "Zonyl™ UR". Zonyl™ UR has a surface energy of from 16 to 20 dynes/cm.

The amorphous perfluorocarbons have the general structure:

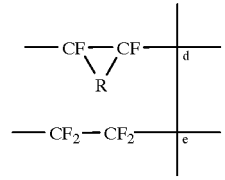

where R represents the atoms and electrons necessary to complete a perfluoro ring having a total of 5 carbons and heteroatoms, and d and e are mole fractions having a sum of 1. Some specific examples of a commercially available amorphous perfluorocarbons are identified by the general structure:

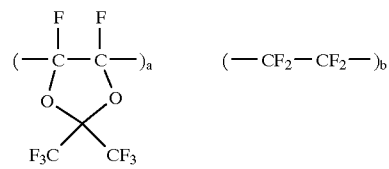

where a and b are mole fractions having the sum of 1. An amorphous perfluorocarbon having this structure where a=0.65 and b=0.35 is available from E. I. du Pont de Nemours and Co under the designation: "Teflon™ AF 1600". Another amorphous perfluorocarbon having this structure where a=80 and b=20 is available from E. I. du Pont de Nemours and Co under the designation: "Teflon™ AF 2400". Teflon™ AF 1600 and Teflon™ AF 2400 are aqueous or non-aqueous copolymerization products of tetrafluoroethene and 2,2-bis(trifluoromethyl)-4,5-difluoro-1,3-dioxolane. The glass transition temperature ($T_g$) of Teflon™ AF materials is a function of the relative mole fractions of a and b. Teflon™ AF 1600 has a $T_g$ of 160° C. Teflon™ AF 2400 has a $T_g$ of 240° C. Suitable $T_g$'s for the material of the transfer surface 14 are in the range of about 35° C. to about 300° C.

The transfer layer is not limited to a particular thickness, however, it is desirable that the transfer layer be thin so as to minimize usage of the low surface energy material. Since excessive surface roughness of the transfer layer tends to cause areas of the toner image to be retained on the transfer layer after fusing of the transferable toner image, the transfer layer should be sufficiently smooth to ensure substantially complete transfer of the toner image to the digital disc. For a thin transfer layer, surface roughness reflects the roughness of the underlying support, thus, a smooth support should be used.

A thin, smooth transfer layer can be conveniently provided by gravure coating or stamp coating a 0.5 to 2.0 micrometer thick layer of the low surface energy material onto a sheet of high quality graphic arts paper or laser printer paper. For example, the support layer can be a sheet of high-clay, acid-sized paper having a Sheffield smoothness of from about 120±40 to about 160±40. Specific examples of suitable papers are "Spectratech Laser Gloss™" electrophotographic paper, marketed by Scott Paper Company, of Boston, Mass., and "Vintage Velvet™" graphic arts paper, marketed by Potlatch corp., of San Francisco, Calif. The support layer is not limited to paper, but can be transparency material or other material suitable for use as an electrophotographic receiver, that is adequately smooth and meets other requirements of a particular use.

The transfer layer 19 is substantially free of "bare spots" or other artifacts which would adversely effect the image. The partial transfer sheet 11 has an upper or receiving surface 21 and a lower surface 23. The transfer layer 19 is united with the receiving surface 21 of the partial transfer sheet 11. The transfer layer 19 overlies the transfer portion 10 of the partial transfer sheet 11. The literature portion 13 of the partial transfer sheet 11 lacks the transfer layer 19. The relative sizes of the literature and transfer portions 13,10 are determined by the uses of the respective portions in labelling the digital disc and providing the accompanying literature. As a result, the literature portion 13 can have a total area exceeding the area of the transfer portion 10. The literature portion 13 can be printed on only the upper surface 21 or can be printed on both surfaces 21,23 using a printer having a duplexing capability.

The partial transfer sheet 11 can include a visible indicator (not shown) on the receiving surface 21 to aid an operator in properly orienting the sheets 11 in the paper supply of the printer 12. The visible indicator can be located in a "waste" section of the literature or transfer portion 13,10.

The toner image is printed on the partial transfer sheet 11 using a conventional electrophotographic printer or copier. A preferred electrophotographic printer for use in the method of the invention is a Kodak™ ColorEdge™ printer, Model 1550+, marketed by Eastman Kodak Company of Rochester, N.Y.

The image is printed onto the partial transfer sheet 11 in a normal orientation on the literature portion 13 and in a mirror image orientation on the transfer portion 10. The literature and transfer portions 13,10 can both include information subject to electrophotographic printing, such as color pictorial images, text, and magnetically readable characters. The transferable image 16 may be opaque or semitransparent. If the color pictorial images are semitransparent, then it may be desirable to adjust the color balance of the literature and transfer portions 13,10 to accommodate color differences due to the underlying support material, paper or other electrophotographic receiver in the case of the literature portion 13 and the face of the digital disc in the case of the transfer portion 10. Such adjustments of color balance can be conveniently provided by digital manipulation of the image by methods well known to those skilled in the art or, for particular embodiments of the invention, by a method disclosed in a U.S. Patent Application, entitled: "COMPOSITE SHEET AND METHODS FOR PRINTING DIFFERENTLY-TRANSFORMED IMAGES USING COMPOSITE SHEET", filed concurrently herewith, by Eric Zeise (which is hereby incorporated herein by reference). Color balance could also be addressed by the use of white ink or white toner to modify the coloration of all or part of the face of the digital disc.

Image information used by the printer can be supplied a variety of ways well known to those skilled in the art. Information can be supplied from a hard or floppy disc in a microcomputer. Information can be supplied by a scanner, or the equivalent portion of a copier. Information can be supplied from a remote source via a computer interface.

After printing, the literature and transfer portions 13,10 of the partial transfer sheet 11 are separated. It is preferred that the literature and transfer portions 13,10 be cut from the partial transfer sheet 11; however, other separation means known to those skilled in the art could be used. For example, perforated tear-lines or the like could be provided in the partial transfer sheet 11. The separation can be performed in a single operation or a sequence of steps. The literature portion 13 can be divided into one or more pieces of appropriate shape, and waste, can also be removed from one or both portions. The partial transfer sheet 11 can be cut apart by any of a wide variety of separation devices. For example, the partial transfer sheet 11 can be cut in a single step using an appropriately configured punch. (A separation device is indicated diagrammatically in FIG. 1 by a punch 25.) The sheet 11 can be sliced during movement relative to rotary cutters or stationary knives, the sheet 11 can be cut by hand.

Figure 4:
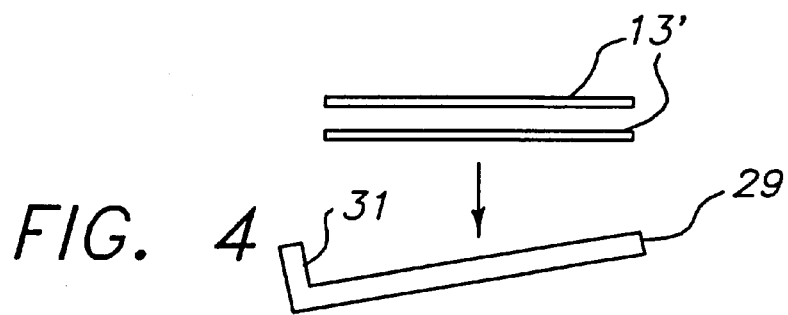
FIG. 4 is a diagrammatical view of an optional collating and organizing step of the method of FIGS. 1 and 2.

Referring now to FIG. 2, the literature portion 13 is configured, as required for a particular use, by a literature configuration system, indicated diagrammatically in FIG. 2 by box 27. If the literature portion 13 has been divided into two or more separate pieces 13', then those pieces can be collated or otherwise ordered as necessary. This is illustrated diagrammatically in FIG. 4, which shows pieces 13' dropping into a slanted tray 29 having a stop 31. Other equipment for collating and organizing pieces of electrophotographic media are well known to those skilled in the art. The piece or pieces 13' of the literature portion can be folded or shaped either individually or as a collated stack. FIGS. 1–2 show a literature portion 13 cut into three pieces. One of the pieces 13' is then folded at one end to form a backplate 13a for a jewel box 33. Two of the pieces 13' are collated and folded to form an insert booklet 13b. If an insert booklet 13b is made from multiple pieces 13', then it is generally desirable, prior to folding, to fasten the pieces of the unfinished booklet together by saddle stitching, stapling or the like.

Figure 5:
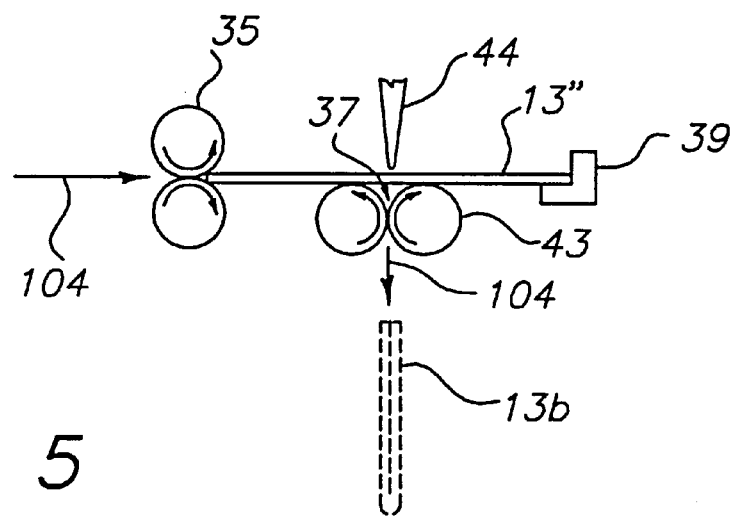
FIG. 5 is a diagrammatical view of an optional folding step of the method of FIGS. 1 and 2.
Figure 6:
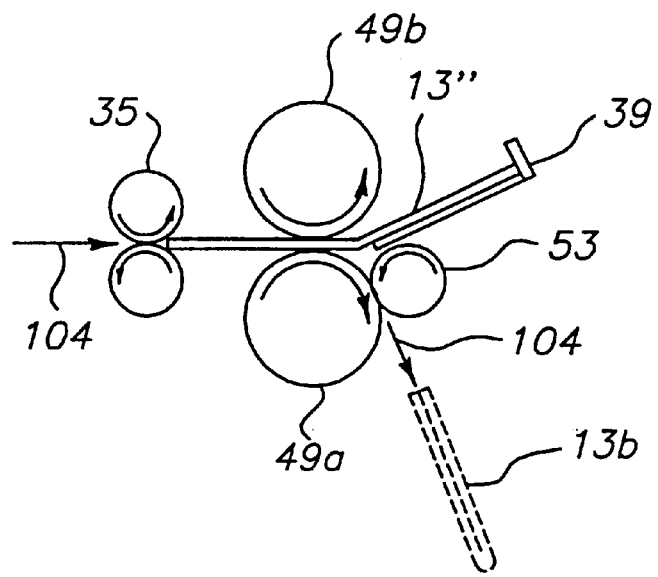
FIG. 6 is a diagrammatical view of an alternative optional folding step of the method of FIGS. 1 and 2.

A pair of alternative folding procedures are illustrated in FIGS. 5 and 6. Referring now to FIG. 5, arrows 104 indicate the direction of travel of the pieces 13. A pair of oppositely rotating rollers 35 drives an unfinished booklet 13" against an end stop 39. A knife edge 41 then descends and drives the center of the unfinished booklet 13" into the nip 37 of a second pair of oppositely rotating rollers 43 where the unfinished booklet 13" is folded to form an insert booklet 13b. The second pair of rollers 43 then discharges the booklet 13b. Referring to FIG. 6, a pair of oppositely rotating rollers 35 drives an unfinished booklet 13" through a first nip 45, then through a second nip 47 between a pair of high friction rollers 49a,49b until the unfinished booklet 13" encounters a stop 39. The high friction rollers 49a,49b then force the unfinished booklet 13" into the nip 51 formed by one of high friction rollers 49a and a final counter-rotating roller 53. The resulting folded booklet 13b is then discharged.

Referring again to FIG. 2, the separated transfer portion 10 is placed in registration with the receiving surface of a digital disc 18 and the transferable toner image 16 is then fused to the juxtaposed face 22 of the digital disc 18, within a fusing system, indicated diagrammatically in FIG. 2 by box 28. FIG. 2 illustrates fusing using a lamination jacket and a roller fuser (details of this procedure are discussed below); however, this illustration is diagrammatical and should be considered to be inclusive of other fusers and fusing methods known to those of skill in the art.

Registration can be provided by any of a variety of registration features, structures that limit relative movement of the transfer portion 10 and digital disc 18 during fusing. In a simple example, the transfer portion 10 can be cut into a circle of the same diameter as the digital disc 18 and can then be fused in a die or appliance having a cylindrical recess sized to closely receive the digital disc 18 and transfer portion 10. The appliance can have multiple recesses to fuse several transfer portion-digital disc pairs 20 simultaneously.

Fusing can be provided by heat, or pressure or preferably by a combination of both heat and pressure. Fusing can be accomplished by pressing the transfer portion 10 and digital disc 18 together in a heated die (not shown) configured to hold the transfer portion 10 and digital disc 18 in registration, with or without a lamination jacket or the like. An alternative procedure is roller laminating. The term "roller laminating" and similar terms are used herein to refer to procedures in which pressure is applied by moving an object through the nip between a pair of rollers or through other structures that apply heat and pressure in a similar manner. For example, an object can be roller laminated by supporting the object on a flat plate and rocking a curved heated platen over the object. As a matter of convenience, the term "rollers" is used generally herein to refer to both actual rollers and other roller lamination components. In roller laminating it is highly preferred that the fuser be compliant, that is, that the "nip 30" be subject to enlargement by the passage of the transfer portion-digital disc pair 20. The transfer portion 10 and digital disc 18 are in registry during fusing. The transfer portion 10 and digital disc 18 can be fed through the nip 30 without an appliance or holder; however, it is currently preferred that the transfer portion 10 and digital disc 18 be placed in a lamination jacket 24 during fusing.

Figure 7:
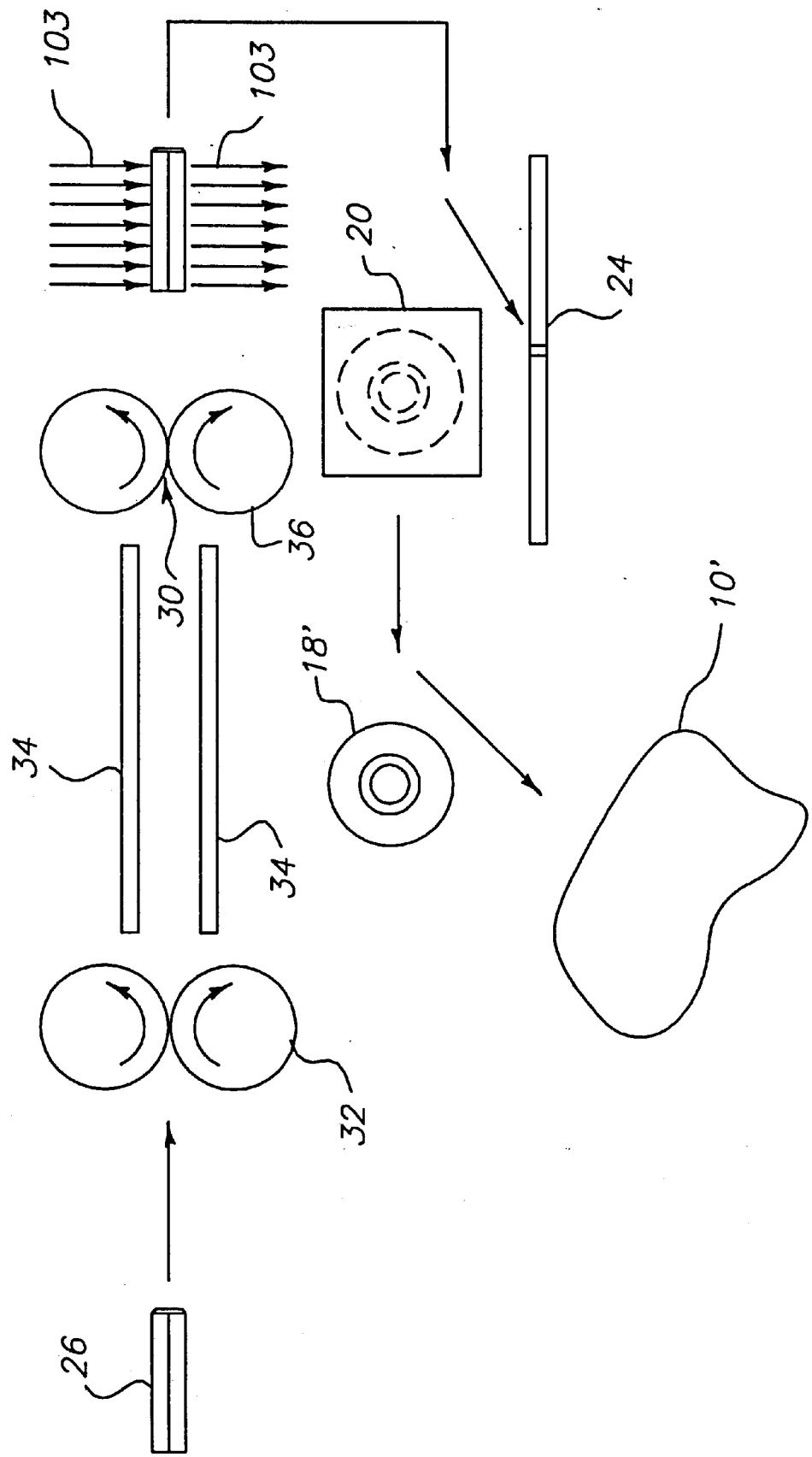
FIG. 7 is a diagrammatical view of details of the fusing procedure of the method of FIGS. 1 and 2.

Currently preferred fusing procedures are illustrated in FIG. 7. The transfer portion 10 and digital disc 18 are both placed within the lamination jacket 24 (also shown in FIGS. 8–10). The transfer portion 10 and digital disc 18 are in registration and the transferable image 16 is juxtaposed against the face 22 of the digital disc 18. The transferable image 16 is located on the transfer portion 10 such that, when the transfer portion 10 and digital disc 18 are in registry, then the transferable toner image 16 and digital disc 18 will also be registered. The registered transfer portion 10 and digital disc 18 are referred to collectively herein as a transfer portion-digital disc pair 20. The lamination jacket 24 maintains registration and protects the transfer portion-digital disc pair 20 during fusing.

The transferable toner image 16 is then fused to the juxtaposed face 22 of the digital disc 18. In fusing, the filled jacket 26 is roller laminated by being fed to a pair of feed rollers 32 and then between a pair of heated plates 34, and through the nip 30 between a pair of compliant fusing rollers 36.

Figure 11:
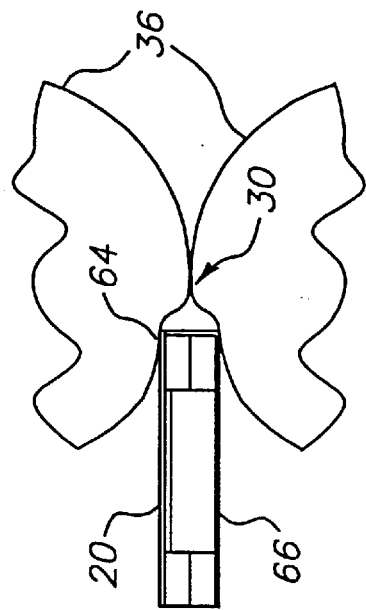
FIGS. 11–14 are semi-diagrammatical views of the fusing procedure of FIG. 7, in sequential order.
Figure 12:
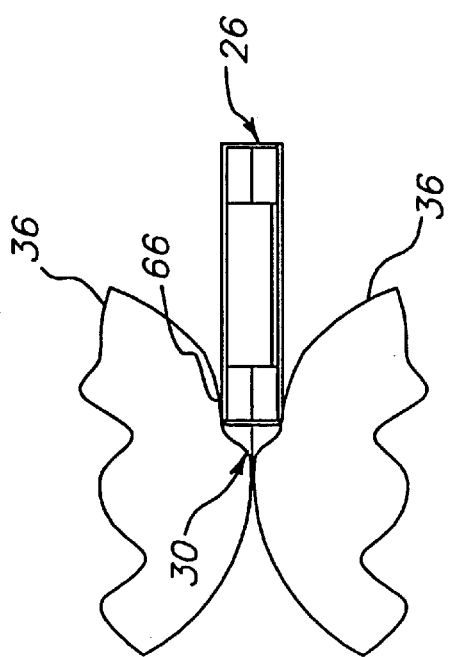
Figure 13:
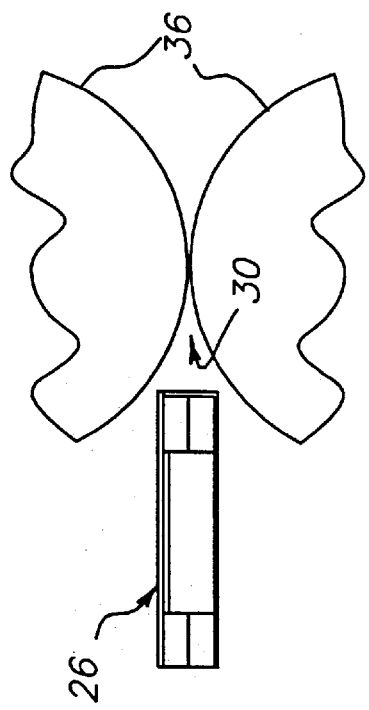
Figure 14:
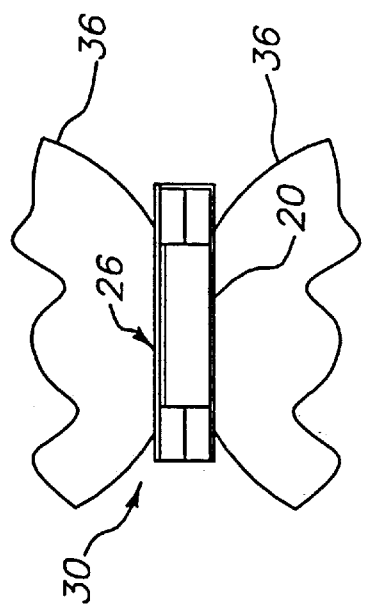

In this fuser, nip 30 is indirectly heated. Rollers 36 can also be directly heated by internal heating elements (not shown) or the like. The lamination jacket 24, as discussed in detail below, not only keeps registration and generally protects the transfer portion 10 and digital disc 18, but also helps maintain a substantially uniform pressure on the transfer portion-digital disc pair 20 during the fusing step. The lamination jacket 24 does so, by enlarging the nip 30, that is, deflecting the compliant rollers 36 outward from the nip 30, before the transfer portion-digital disc pair 20 enters and after the transfer portion-digital disc pair 20 exits. The resulting constant nip size, for the transfer portion-digital disc pair 20, provides the substantially uniform pressure. The deflection of compliant fusing rollers 36 and enlargement of nip 30 is shown in FIGS. 11–14. In FIG. 11, the filled jacket 26 is fed into the nip 30. In FIG. 12, the leading drift 64 causes full deflection of nip 30 prior to entry of the transfer portion-digital disc pair 20 into nip 30. In FIG. 13, the transfer portion-digital disc pair 20 passes through the fully deflected nip 30. In FIG. 14, the nip 30 is held fully deflected by trailing drift 66, until transfer portion-digital disc pair 20 has completely exited the nip 30. Drifts 64,66 are discussed in detail below.

Figure 8:
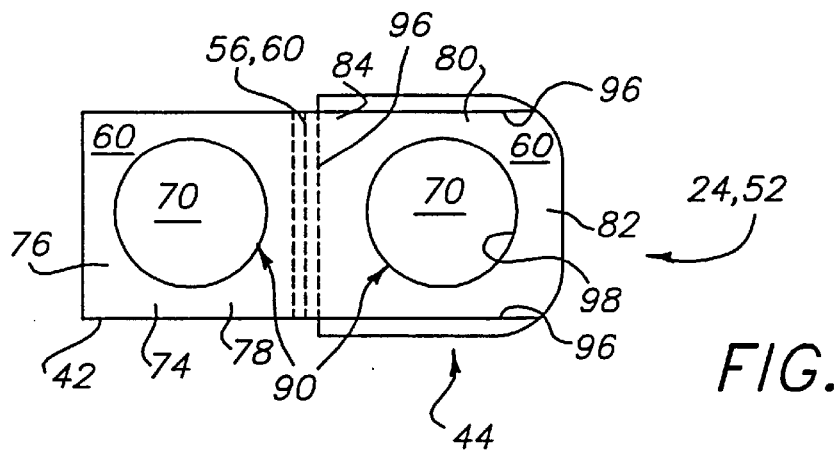
FIG. 8 is a top plan view of a lamination jacket useful in the fusing procedure of FIG. 7. The lamination jacket is illustrated in an open configuration. The hinge is indicated by dashed lines.
Figure 9A:
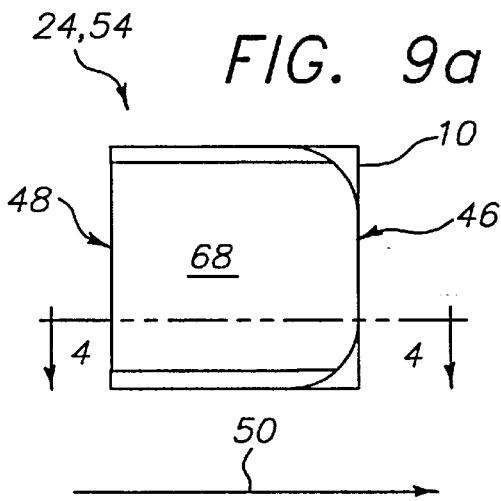
FIG. 9a is a top plan view of the lamination jacket of FIG. 8 in a closed configuration and filled with a transfer support and digital disc.
Figure 9B:
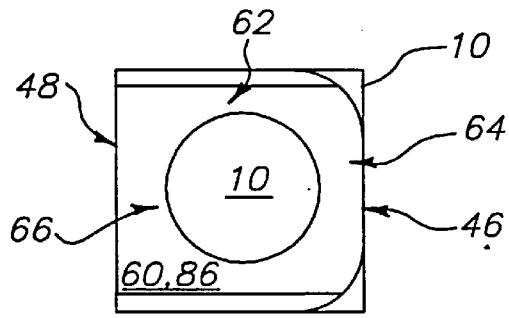
FIG. 9b is the same view as in FIG. 9a, except that the shell of the lamination jacket is removed.
Figure 10:
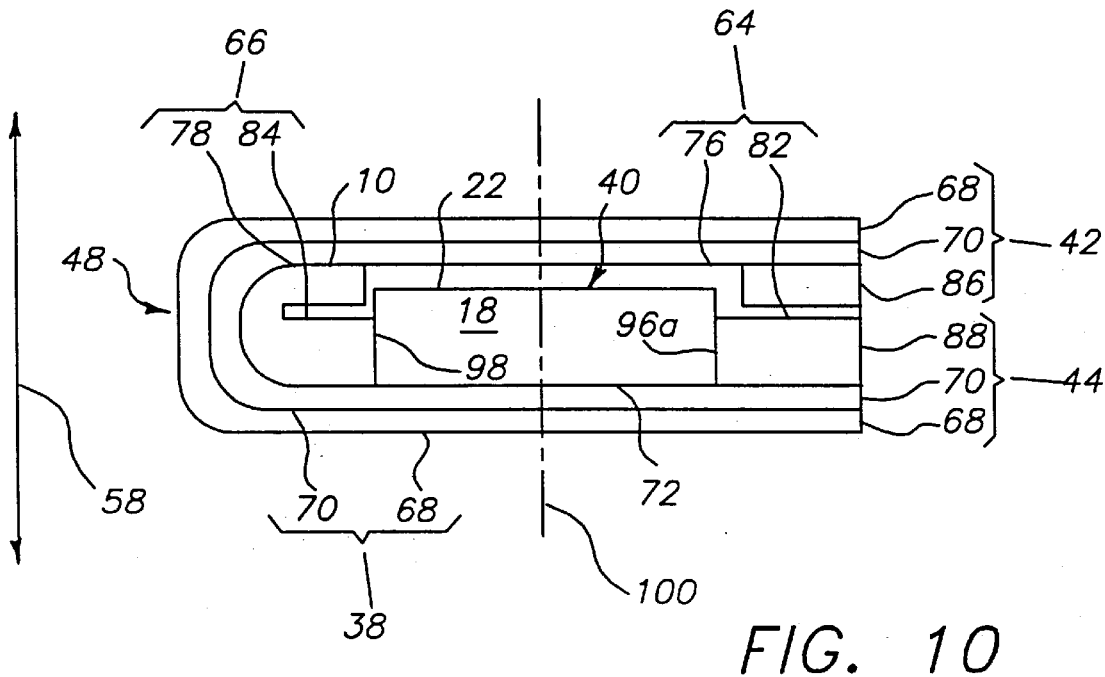
FIG. 10 is a cross-sectional view of the filled jacket of FIG. 9 taken substantially along line 4—4.

A suitable lamination jacket 24 is shown in FIGS. 8–10. The lamination jacket 24 has a shell 38 which defines a pocket 40 for closely receiving the transfer support 10 and the digital disc 18. The shell 38 has opposed upper and lower flaps 42,44. The flaps 42,44 have front and rear flap margins 46,48 defining an axis of travel (indicated by arrow 50) of the lamination jacket 24 through the fuser 28. The flaps 42,44 are movable relative to each other between an open or separated configuration 52 in which the flaps 42,44 are spaced apart and a closed or juxtaposed configuration 54 in which the flaps 42,44 are overlapped. The flaps 42,44 are preferably joined together by a hinge 56.

The pocket 40 has a depth dimension, indicated by arrow 58, substantially perpendicular to the axis of travel and length and width dimensions substantially aligned with the larger dimensions of the flaps 42,44. The pocket 40 can be formed as a result of compliance of the flaps 42,44 about an interleaved transfer support 10 and digital disc 18. It is preferred, however, that the pocket 40 defined by the flaps 42,44 be further defined by an insert 60 disposed interior to the shell 38. The shell 38 and insert 60 can be made from a single unitary structure; however, the shell 38 and insert 60 can be discrete structures permanently adhered together.

The insert 60 can have a collar 62, a leading drift or leading edge section 64, a trailing drift or trailing edge section 66. The drifts 64,66 are forward and rearward of the collar 62, respectively. The collar 62 adjoins the pocket 40 and extends from the leading drift 64 to the trailing drift 66. The insert 60 can be a unitary structure or can comprise several pieces. The collar 62 can be deleted such that the insert 60 consists of leading and trailing drifts 64,66. The insert 60 can be limited to a single drift 64 or 66.

The materials used for the lamination jacket 24 must be sufficiently compliant such that pressure imposed on the shell 38 is substantially transferred to the transfer support-digital disc pair 20. On the other hand, it is undesirable for the lamination jacket 24, and in particular the shell 38, to be so limp that the flaps 42,44 readily assume a plurality of closed configurations. It is instead highly preferred that the materials used for the lamination jacket 24 are sufficiently stiff that the hinge 56 biases the flaps 42,44 against assuming configurations in which the flaps 42,44 are skewed relative to each other.

The shell 38 and insert 60 can be made as a single unitary structure or can take the form of separate components joined together. The shell 38 and insert 60 can also be partially unitary. For example, the insert 60 and part of the shell, such as an inner layer, can form a unitary structure having one or more additional shell layers adhered over the outside.

The lamination jacket 24 can be made from low cost materials such as papers and plastic films; however, the lamination jacket 24 must be configured to alleviate any undesirable characteristics of materials used. For example, it is highly desirable that the lamination jacket 24 not offset onto the fuser 28 during use and that moisture be excluded from the transfer support-digital disc pair 20 during fusing. Some plastics readily offset at fusing temperatures and pressures. Papers have high moisture contents.

An example of a lamination jacket 24 that overcomes these shortcomings is shown in FIGS. 8–10. The shell 38 has two layers 68,70. A non-offset layer 68 of paper is disposed on the outside. A moisture barrier layer 70 of plastic film is disposed on the inside between the non-offset layer 68 and the insert 60. Suitable materials for the moisture barrier layer 70 include polyester and polypropylene. The insert 60 is a moderately stiff, heavy stock paper like bristol board. A variety of other materials could also be used for the layers 68,70, taking into consideration the conditions encountered within the nip 30. For example, the glass transition temperature of polymers used should not be below the temperatures encountered in the nip.

Referring again to FIGS. 8–10, when the lamination jacket 24 is in closed configuration 54, the digital disc 18 contacts the insert 60 only along the circumference of the disc 18. The bottom 72 of the disc 18 contacts the moisture barrier layer 70 of the shell 38. The face 22 of the disc 18 contacts the transfer support 10, which also mostly contacts the shell 38 rather than the insert 60. The result is that the moisture barrier layer 70 substantially moisture-proofs the transferable image 16 and digital disc 18 relative to the paper insert 60 during fusing. The non-offset layer 68 protects the moisture barrier layer 70 from the fuser 28 so that the shell 38 is substantially free from offset at a temperature and pressure sufficient to fuse the transferable image 16 to the digital disc 18.

The shell 38 is preferably configured to extend over the entire bottom of the digital disc 18 and the backside of the transfer support 10 to substantially isolate the transferable image 16 and digital disc 18 from the fuser 28 and protect against scuffing or other mechanical injury during transport. Referring now to FIGS. 9a–9b, extreme corners of the lamination jacket 24 can be left as sharp points or can be radiused or the like, as desired. If the transferable image 16 is rectangular, then radiused corners can provide a visual reference as to whether a transfer support 10 has been placed within the lamination jacket 24.

The leading drift 64 adjoins the front flap margin 46. The trailing drift 66 adjoins the rear flap margin 48. The drifts 64,66 are each transverse to the axis of travel 50 and tangential or substantially tangential to the pocket 40. In the embodiment of the lamination jacket 24 of FIGS. 8–10, the drifts 64,66 each have substantially the same width dimension as the pocket 40 in a direction substantially perpendicular to the axis of travel 50. Drifts 64,66 having a width-wise extension that is less than that of the pocket 40 are not considered optimal. Extension of drifts 64,66 substantially beyond the pocket 40 in the directions of the width dimension is not considered critical, but can be provided as a matter of design convenience.

During fusing the drifts 64,66 force resilient expansion of the nip 30 forward of the transfer support-digital disc pair 20 and allow resilient contraction of the nip 30 rearward of the transfer support-digital disc pair 20. This provides a substantially uniform area within the nip 30 during fusing of the toner image, so as to minimize non-uniformities in the pressure applied by the compliant rollers to the face 22 of the disc 18. When the lamination jacket 24 passes between the compliant rollers 36, the nip 30 expands and contracts in spaced relation to the pocket 40 and maintains a substantially constant dimension as the pocket 40 passes through the nip 30. Non-uniform pressure or areas of excess pressure, are apparently due to less area within the nip 30, and were determined to be related to localized smearing of the toner image.

It is currently preferred that the drifts 64,66 expand the nip 30 to the same extent as the transfer support-digital disc pair 20. This can be provided by a lamination jacket 24, that is made of relatively incompressible materials and that, at least when filled, has a constant thickness. The lamination jacket 24 of FIGS. 8–10 meet this provision. The drifts 64,66 each have a constant thickness that is substantially the same as the depth of the pocket 40 and the thickness of the transfer support-digital disc pair 20. Since the transfer support 10 is ordinarily thin, the thickness of the drifts 64,66 is also substantially the same as the thickness of the digital disc 18. For example, 50 mils is a suitable thickness for drifts 64,66 for use with a commonly used variety of digital disc 18 having a standardized thickness of about 50 mils.

In the embodiment of the lamination jacket of FIGS. 8–10, the collar 62 and drifts 64,66 each have an upper subunit 74,76,78, respectively, and a lower subunit 80,82,84, respectively. The upper subunits 74,76,78 together define a unitary upper half-insert 86. The lower subunits 80,82,84 together define a unitary lower half-insert 88. The two half-inserts 86,88 together have substantially the same thickness as the digital disc 18, that is, a thickness that is substantially equal to the depth of the pocket 40. The upper half-insert 86 is joined to the upper flap 42. The lower half-insert 88 is joined to the lower flap 44. The half-inserts 86,88 are displaceable relative to each other between a open or spaced apart configuration and a closed or juxtaposed configuration. The half-inserts 86,88 each have a cut-out 90. The cut-outs 90 each have an inner end 92 and an outer end 94. The outer ends 94 of the cut-outs 90 are occluded by the shell 38. The inner ends 92 are substantially aligned when the half-inserts 86,88 are in the closed conformation, so that the cut-outs 90 together define continuous lateral boundaries for pocket 40, which is shaped like a short cylinder having a diameter only slightly larger than the diameter of the digital disc 18 and a depth that is substantially equal to the thickness of the digital disc 18. It is convenient if each half-insert 86,88 has a uniform thickness equal to about half the thickness of the digital disc 18.

The lamination jacket 24 includes transfer support and digital disc guides 96,98 for registering the transfer support 10 and digital disc 18 within the pocket 40. The transfer support 10 and digital disc 18 are both registered relative to the lamination jacket 24, and thus registered relative to each other. With the lamination jacket 24 in the open configuration 52, the guides 96,98 aid in the placement of the transfer support 10 and digital disc 18 within the lamination jacket 24, by inhibiting lateral movement once the digital disc 18 or transfer support 10 has attained a registration position. With the lamination jacket 24 in closed configuration 54, the guides 96,98 help inhibit relative movement of the transfer support 10 and digital disc 18 during fusing. The guides 96,98 adjoin one or both flaps 42,44.

The guides 96,98 can provide registration in one or two dimensions. Movement of the transfer support-digital disc pair 20 in a first dimension parallel to the central axis 100 of the digital disc 18 is constrained by the overall configuration of the lamination jacket 24 and by the fuser 28. The guides 96,98 constrain movement in one or both of the two dimensions, referred to herein as "length" and "width", perpendicular to the central axis 100 of the digital disc 18. It is preferred that guides 96,98 constrain movement of the transfer support 10 and digital disc 18 in length and width dimensions.

A convenient configuration for the digital disc guide 98 that provides length and width registration is a continuous or discontinuous ring that closely fits with a complementary structure on the digital disc 18. If the ring is discontinuous, it preferably has three or more contact points spaced to limit disc movement in length and width dimensions. The digital disc guide 98 can closely fit the outer edge of the digital disc 18 or a complementary structure on the digital disc 18, for example, an annular indentation near the inner margin. In the lamination jacket shown in FIGS. 8–10, the digital disc guide 98 is a portion of the rim of the pocket 40.

The configuration of the transfer support guide 96 depends upon the configuration of the transfer support 10. For example, if the transfer support 10 is circular in outline and about the same diameter as the digital disc 18, then the transfer support guide 96 is a portion of the rim of the pocket 40. If the transfer support 10 is rectangular or square in outline, then the transfer support guide 96 can be appropriately located tabs or edges protruding from the insert 60 or shell 38. The lamination jacket 24 shown in FIGS. 8–10, can utilize both disc-shaped and rectangular transfer supports. The rim of cut-outs 90 has an upper portion that defines guide 96a, which can engage disc-shaped transfer supports, and a lower portion that defines guide 98, which can engage discs.

Tolerances for the guides 96,98 are determined by acceptable tolerances for the position of the image on the completed disc. Ordinarily rotation of the position of the transferable image 16 about the axis 100 of the disc 18 is inconsequential. Thus the primary tolerance at issue for locating the transferable image 16 on the digital disc 18 is the radial offset of the center of the image from the axis 100 of the digital disc 18. An example of a suitable tolerance is 1 mm in radial offset.

With transfer portions 10 having a circular or other radically symmetrical outline, alignment of the transfer portion 10 and digital disc 18 about a common center can be easily established solely by use of appropriately sized guides 96,98. With rectangular transfer portions 10 or transfer portions 10 having a non-centered transferable image 16 or the like, it may be convenient to provide one or more visible indicators (not shown) as registration aids on the transfer portion 10, and, if desired, on the lamination jacket 24. For example, the transfer portion 10 and lamination jacket 24 can include matching arrows or other visible indicators to aid an operator in properly orienting the transfer portion 10 relative to the lamination jacket 24. A visible indicator can be located in a "waste" section of the transfer portion 10.

In use, referring, for example, to the embodiment of the invention shown in FIGS. 8–10, the lamination jacket 24 is opened, a digital disc 18 is placed in one of the cut-outs 90, a circular transfer portion 10 is placed in the other cut-out, and the jacket is closed to superimpose the two cut-outs 90. The lamination jacket 24 is heat and pressure roller laminated, for example, by the procedure illustrated in FIG. 7. The filled jacket 24 including the transfer portion 10 and digital disc 18 is transported by drive rollers 32 through a heating zone 34 to a set of compliant rollers 36. The lamination jacket 26 is then rolled hot by compliant rollers 36 to fuse the transferable toner image 16 to the digital disc 18.

After fusing, the filled jacket 26 is cooled, indicated diagrammatically in FIG. 7 by arrows 103, and is then opened and the fused transfer portion-digital disc pair 20 is removed from the lamination jacket 24. The used transfer portion 10' is stripped off, resulting in the completed digital disc 18' bearing a fused toner image (not indicated in figure). The used transfer portion 10' and lamination jacket 24 can be discarded or, if undamaged, can be reused.

The completed digital disc and accompanying literature are then assembled along with any other necessary packaging. This is illustrated in FIG. 2 for an information package including a digital disc 18, a jewel box 33, a backplate 13a, and an insert booklet 13b. Collection of the different components and assembly into the final product can be accomplished by hand of by automated equipment like that currently used to package digital discs and accompanying literature in jewel boxes.

| PARTS LIST | |
|---|---|
| 10 | transfer portion |
| 11 | partial transfer sheet |
| 12 | copier |
| 13 | literature portion |
| 13' | separate pieces |
| 13a | backplate |
| 13b | insert booklet |
| 15 | fused toner image |
| 16 | transferable image |
| 17 | support layer |
| 18 | digital disc |
| 18' | completed digital disc |
| 19 | transfer layer |
| 20 | transfer portion-digital disc pair |
| 21 | upper or receiving surface |
| 22 | face |
| 23 | lower surface |
| 24 | lamination jacket |
| 25 | punch |
| 26 | filled jacket |
| 27 | literature config. system |
| 28 | fusing system |
| 30 | nip |
| 31 | stop |
| 32 | feed rollers |
| 33 | jewel box |
| 34 | heated plates |
| 35 | oppositely rotating rollers |
| 36 | fusing rollers |
| 37 | nip |
| 38 | shell |
| 39 | end stop |
| 40 | pocket |
| 41 | knife edge |
| 42 | upper flaps |
| 43 | oppositely rotating rollers |
| 44 | lower flap |
| 45 | first nip |
| 46 | front flap margin |
| 47 | second nip |
| 48 | rear flap margin |
| 49a,49b | high friction rollers |
| 50 | axis of travel |
| 51 | nip |
| 52 | open or separated configuration |
| 53 | counter-rotating roller |
| 54 | closed or juxtaposed configuration |
| 56 | hinge |
| 58 | depth dimension |
| 60 | insert |
| 62 | collar |
| 64 | leading drift |
| 66 | trailing drift |

-continued

PARTS LIST

| | |
|---|---|
| 68 | non-offset layer |
| 70 | moisture barrier layer |
| 72 | bottom |
| 74 | upper collar subunit |
| 76 | upper front drift subunit |
| 78 | upper rear drift subunit |
| 80 | lower collar subunit |
| 82 | lower front drift subunit |
| 84 | lower rear drift subunit |
| 86 | unitary upper half-insert |
| 88 | unitary lower half-insert |
| 90 | cut-outs |
| 96 | transfer portion guide |
| 98 | digital disc guide |
| 100 | central axis |
| 101 | arrows |

We claim:

1. A method for preparing a digital disc-literature assembly, the method comprising the steps of: electrophotographically printing a sheet of print media, providing on the sheet a literature portion bearing a fused toner image and a transfer portion bearing a transferable toner image; providing a digital disc; placing the transferable toner image and a face of the digital disc in registration; fusing the transferable toner image to the face; configuring the literature portion for inclusion with the digital disc; assembling the digital disc and the literature portion.

2. The method of claim 1 wherein the fusing step further comprises the step of roller laminating the transferable toner image to the digital disc.

3. The method of claim 1 further comprising during the fusing step, the step of maintaining the registration of the transferable toner image and the face.

4. The method of claim 1 further comprising after the fusing step, the step of separating the transfer portion from the digital disc.

5. The method of claim 4 further comprising prior to the separating step, the step of cooling the digital disc.

6. The method of claim 1 further comprising prior to the transferring step, the step of cutting the transfer portion from the sheet.

7. The method of claim 1 further comprising prior to the fusing step, the step of cutting the literature portion from the sheet.

8. An apparatus for labelling a face of a digital disc and for preparing literature for the digital disc, the apparatus comprising: an electrophotographic printer printing a sheet having a literature portion bearing a fused toner image and a transfer portion bearing a transferable toner image; a separation device, associated with said electrophotographic printer, receiving the sheet from the electrophotographic printer and separating the literature and transfer portions of the sheet; a fusing system, associated with said electrophotographic printer, receiving the transfer portion and the digital disc, the fusing system fusing the transferable toner image to the face of the digital disc, the fusing system having registration features maintaining the transfer portion and the digital disc in registration during the fusing; and a configuration system configuring the literature portion for inclusion with a digital disc.

9. The apparatus of claim 8 wherein the fusing system further comprises a pair of compliant rollers having a nip receiving the transfer portion and the digital disc, in registration, and a heater disposed to supply heat to the transferable toner image in proximity to the nip.

10. The apparatus of claim 8 wherein the configuration system further comprises devices for folding, collating, and fastening the literature portion to form an insert booklet.

* * * * *